Figure 1:
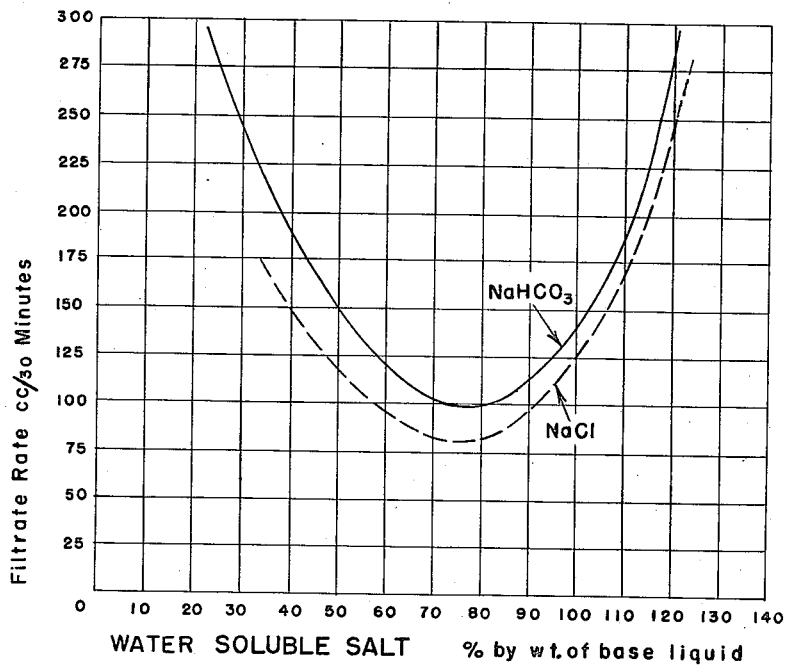

Jan. 26, 1954

G. C. HOWARD 2,667,224

WELL COMPLETION PROCESS

Filed June 29, 1949

INVENTOR.
GEORGE C. HOWARD
BY
ATTORNEY

Patented Jan. 26, 1954

2,667,224

UNITED STATES PATENT OFFICE 2,667,224

WELL COMPLETION PROCESS

George C. Howard, Tulsa, Okla., assignor to Stanolind Oil and Gas Company, Tulsa, Okla., a corporation of Delaware Application June 29, 1949, Serial No. 101,968

8 Claims. (Cl. 166—21)

This invention pertains to an improvement in the process of completing wells by hydraulically fracturing the formations penetrated by the well. More particularly this invention is concerned with an improvement in the process of and composition of matter for completing wells by fracturing the formations penetrated by the well with a low-penetrating fluid, and subsequently by contact with the formation fluids converting the low-penetrating fluid into a high-penetrating fluid which may be removed from the fractured formation as the well is produced.

In the art of completing wells by hydraulically fracturing formations, fluids which have a retarded tendency to filter through the permeable rocks penetrated by the well, hereafter called low-penetrating fluids, are injected into the well under pressure. Since these fluids do not readily penetrate the permeable formations, bottom-hole pressures of the order of 0.75 to 1.0 p. s. i. per foot of depth may readily be developed with a high-pressure pump at the surface. When such pressures are developed, it has been found that practically any formation may be fractured, generally along a horizontal bedding plane; the pressure then drops as the fluid flows into the fracture and extends it. As this fracture is extended radially, the filter area increases readily, proportional to the fracture radius squared. Accordingly, the ability to extend the fracture depends to a large extent upon the filtering properties of the fracturing fluid. Propping agents of various weights and densities can be carried by the fracturing fluid into the fracture to support the overburden, and at least partially keep the fracture open.

It is therefore considered highly desirable to employ a fracturing fluid which has a viscosity greater than about 10 centipoises, as measured in the Stormer viscosimeter operating at 600 R. P. M., and a filtrate rate of less than about 100 cc. in 30 minutes, employing the filtration apparatus and process described in American Petroleum Institute, code 29, second edition, July 1942, "Standard Field Procedure for Testing Drilling Fluids," (tentative), section V. Since the fracturing fluid retards flow through the interstices of the formation in order that the formation breakdown pressure (the pressure at which the formations fracture) may be attained, it inherently plugs those pores which it enters. After the fracture is made, it is mandatory therefore that the fracturing fluid be removed not only from the fracture, but from the interstices of the adjacent formations into which it has permeated to permit free flow of the connate fluid from the formation through the fracture and into the well. In addition to the above characteristics of a fracturing fluid, it is generally desirable to employ hydrocarbon-base fluid in oil or gas wells in order to avoid what is known to the art as "water blocking" of the pores of the rocks.

Figure 2:
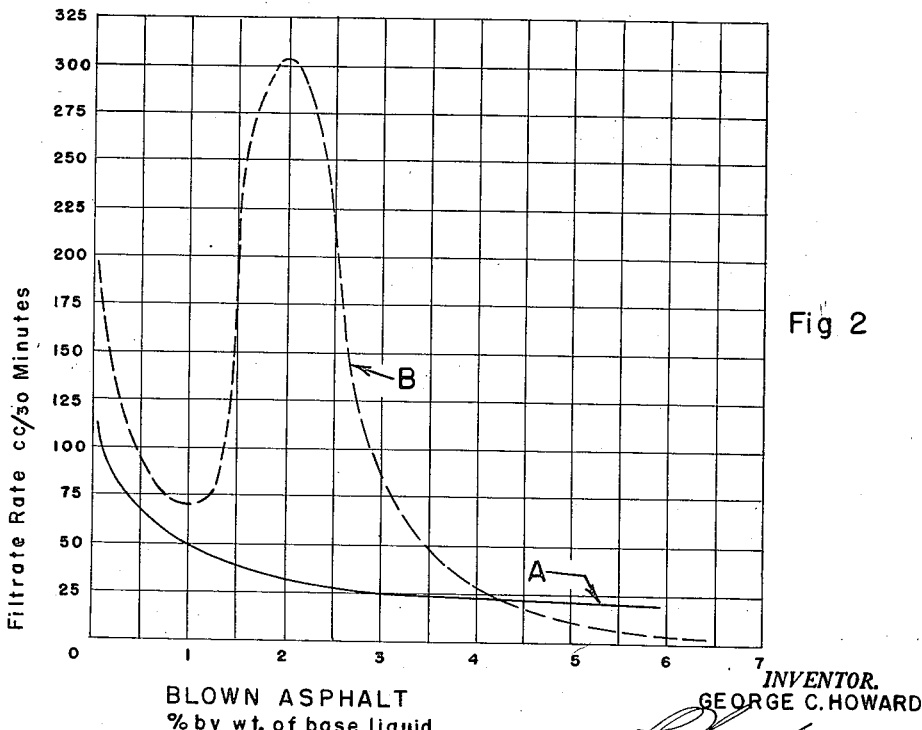

Fracturing fluids of various types have been proposed as a means of accomplishing the above criteria. Most of these fluids are subject to certain disadvantages such as the necessity for injection of gel breaker solutions into the formation to reduce the viscosity or filtrate rate after the fracture has been completed. It is therefore an object of this invention to provide an improved process for fracturing formations and an improved fracturing fluid for use in this process. It is a more specific object of this invention to provide a fracturing fluid which has a suitable viscosity and filtrate rate for producing a fracture in a formation penetrated by a well and which may subsequently be removed from these formations by the connate formation fluids. A still more specific object of this invention is to provide a hydrocarbon-base fracturing fluid containing a finely divided water-soluble solid and a temporary plastering agent, the slurry initially having a filtrate rate of less than about 100 cc. in 30 minutes, and after creation of a fracture, being converted by the connate formation fluids to substantially the viscosity and filtrate rate of the formation fluids. These and other objects of this invention will become more apparent from the following description in which reference will be made to the accompanying drawings where:

Figure 1 shows typical curves of filtrate rate for water-soluble solid—crude oil slurries for representative salts, and Figure 2 shows typical curves of filtrate rate for my improved fracturing fluid having the optimum salt-base liquid ratio (75/100) both before and after the water-soluble salt is dissolved.

I have found, as indicated in Figure 1, that the filtrate rate for slurries of water-soluble solids in a liquid hydrocarbon, such as crude oil or a refined oil such as kerosene, diesel oil, fuel oil, or other high molecular weight liquid hydrocarbons or the like, is at an optimum when the ratio of water-soluble solid to the hydrocarbon is in the range of between about 50 and about 100 parts by weight of solid per 100 parts of the hydrocarbon. Within this range, the viscosity of the slurry, depending somewhat upon the viscosity of the hydrocarbon (as measured by the Stormer viscosimeter), is between about 10 and about 200 centipoises. Within this viscosity range, I have found that a fracturing fluid will carry suspended inert solid particles such as sand, plastic balls, or the like, into the fracture. The inert solid particles will be deposited there as props to maintain the fracture open after the fracturing fluid has been removed.

Finely divided water-soluble solids such as granulated sugar, salt, or the like, which are practically oil insoluble, are within the purview of this invention. Salts of ammonia and of most metals are generally satisfactory when ground to a fineness of between about 100- and 400-mesh. However, some of the metals for example, barium, aluminum, and others in groups II and III of the periodic table, and iron, sometimes, by reaction with the formations or formation waters, produce undesirable precipitates which tend to plug the interstices of the rocks. Accordingly, water-soluble salts of ammonia or the metals of group I, specifically group IA, of the periodic table, are preferred. As a matter of economy, the sodium salts are generally employed, the most desirable sodium salts being sodium chloride, sodium carbonate, and sodium bicarbonate. In view of the wide variety of formation brines, it is generally considered desirable to dissolve the water-soluble salt in the well brine and test for insoluble reaction products before injecting the salt into the well. If a cementatious precipitate such as magnesium silicate, sodium silicate, or calcium silicate, calcium carbonate, barium sulphate, aluminum chloride, aluminum carbonate, aluminum bicarbonate, sodium hydroxide, or any other precipitate—particularly a gelatinous precipitate—is formed, the solid is considered undesirable.

To this slurry of liquid-hydrocarbon-water-soluble solid I add asphalt, preferably blown, to improve temporarily the filtrate properties of the slurry. Brown asphalt, as it is understood in this art, refers to bitumens which have undergone an oxygenation treatment; i. e., have been exposed to the influence of an oxidizing agent such as air, potassium chlorate, potassium permanganate, or the like. The softening point of the asphalt, either straight-run or blown, is preferably above about 100° C. by the ring and ball method. Typically, I employ blown asphalts having a softening point above about 160° C. (R. & B) since the filtrate rate of the slurry is decreased generally (within reasonable limits) as the softening point of the asphalt rises. The reason for a substantial reduction in filtrate rate of the slurry by the addition of a small percent of asphalt is not known, but it appears that the blown asphalt disperses in the oil and plasters the interstices of the finely divided solid grains which are in turn stopped, due to their large particle size, by bridging in the permeable flow channels of the formation. To this slurry I sometimes also add a stabilizer or settling inhibitor such as the oil-soluble soaps—for example, mahogany soap, or the like—which tend to maintain the inert formation props and the water-soluble solid particles in suspension in the hydrocarbon liquid. The oil-soluble soap stabilizing agent may be added to the hydrocarbon at any time during the mixing process. The blown asphalt in the amount of between about 1 and about 3 per cent—preferably about 2 per cent—based on the weight of hydrocarbon, is added to the hydrocarbon either before, simultaneously with, or after the solid is added. With-in this range, as indicated by curve A of Figure 2, the initial filtrate rate of the solid-hydrocarbon slurry containing blown asphalt has a filtrate rate substantially below 100 cc. per 30 minutes. At this low filtrate rate the formation breakdown pressure can be obtained with a high pressure pump with ease in practically all wells.

After the finely divided inert solid formation props and the water-soluble solid have been slurried in the hydrocarbon-asphalt mixture, they are injected into a well. When the well fluid has been displaced into the formation, the pump pressure rises rapidly to the formation breakdown pressure and then drops rapidly, indicating that a fracture has been produced. After the formation has been fractured and the fracturing fluid has been injected back into the formation fracture, this fluid, as indicated above, tends to migrate into the pores of the rocks. It appears that as the liquid in the slurry filters through the rock pores, the inert propping agent is filtered out in the fracture and does not enter the pores; similarly, a large part of the finely divided water-soluble solid is probably filtered out within a short distance of the fracture. In any case, from my tests, it appears that after as little as 5 minutes' contact with formation waters, a substantial part of the water-soluble solid is dissolved by the formation waters. As is well known, all oil-producing formations, even though they do not produce water, contain water which, due to the fact that the formations are preferentially water wet, remains as a film on the sand grains. This water then contacts and dissolves the water-soluble solid, leaving the rock pores substantially in their initial state. At this time, i. e., after the solid particles in the slurry have been dissolved, the filtrate rate of the fracturing fluid containing blown asphalt in the preferred range increases, as indicated by curve B of Figure 2, to greater than about 300 cc. per 30 minutes, which is substantially the filtrate rate of the base hydrocarbon. In a formation which produces oil, the base hydrocarbon containing the blown asphalt will be diluted by the oil as the oil flows from the formation into the formation fracture and thence into the well. In oil wells producing water and oil, the dissolved salt will be produced with the water and the diluted hydrocarbon and asphalt will be produced with the oil. In gas or water injection wells, the filtrate rate of the fracturing fluid will obviously be reduced by solvation and dilution with formation and injection fluids and will thus not deter injection.

It will thus be apparent that the above-described composition is highly suitable for use in completing wells employing the formation fracturing technique. Manifestly, the composition is capable of a wide variety of modification within the ranges given, and other additives may be incorporated in the composition to promote various other characteristics without deviating from the spirit and intent of this invention.

I claim:

1. A method of completing a well comprising introducing into said well under pressure a hydrocarbon fracturing liquid containing between about ⅓ and ½ by weight of a finely divided water-soluble solid and between about 1 and about 3 per cent blown asphalt, fracturing a formation in said well, and thereafter producing said well to remove said fracturing liquid.

2. A method of completing wells comprising introducing into a well a water-soluble solid-liquid hydrocarbon slurry containing between about 1 and about 3 weight per cent blown asphalt and between about 50 and about 100 parts of said water-soluble solid per 100 parts of said liquid hydrocarbon, producing a fracture in a formation penetrated by said well by injecting at least part of said slurry into said formation under a pressure as great as the formation break-down pressure, dissolving said solid in the connate formation water, and thereafter removing the solid-connate formation water solution from said formation.

3. A method of completing wells comprising introducing into a well a water-soluble solid-liquid hydrocarbon slurry containing between about 1 and about 3 weight per cent blown asphalt and between about 50 and about 100 parts of said water-soluble solid per 100 parts of said liquid hydrocarbon, producing a fracture in a formation under a pressure as great as the formation break-down pressure, retaining said slurry in said formation until said water-soluble solid has substantially dissolved, and then withdrawing connate water containing said water-soluble solid from said well.

4. A composition of matter comprising 100 parts of a liquid hydrocarbon, between about 50 and about 100 parts of a water-soluble salt, and between about 1 and about 3 parts of blown asphalt.

5. A composition for fracturing formations penetrated by a well comprising by weight 100 parts liquid hydrocarbons, approximately 75 parts water-soluble salt, and approximately 2 parts blown asphalt.

6. A low penetrating fluid consisting essentially of a slurry of between about 50 and about 100 per cent by weight of a finely divided water-soluble salt in a hydrocarbon liquid containing about 2 per cent by weight of dispersed blown asphalt particles, said salt being chemically stable in said hydrocarbon liquid.

7. A method of completing a well comprising introducing into said well under pressure a hydrocarbon fracturing fluid containing between about 50 and about 100 parts of a finely divided, water-soluble solid and between about 1 and about 3 parts of blown asphalt per 100 parts by weight of said fracturing fluid, said asphalt having a softening point above about 100° C. by the ring and ball method, fracturing a formation in said well by applying a high pressure to said fluid, and thereafter producing said well to remove said fracturing fluid.

8. A method of completing a well comprising introducing into said well under pressure a hydrocarbon fracturing liquid containing between about 1 and about 3 per cent asphalt and sufficient finely-divided water-soluble solid to produce a fracturing liquid having a filtrate rate of less than about 100 cubic centimeters in 30 minutes employing the filtration apparatus and process described in American Petroleum Institute, code 29, second edition, July 1942, "Standard Field Procedure for Testing Drilling Fluids," fracturing a formation in said well and thereafter producing said well to remove the reverted fracturing liquid.

GEORGE C. HOWARD.

References Cited in the file of this patent

UNITED STATES PATENTS

| Number | Name | Date |
| --- | --- | --- |
| 561,725 | Platte | June 9, 1896 |
| 657,951 | Mooney | Sept. 18, 1900 |
| 1,989,374 | Connaughay | Jan. 29, 1935 |
| 2,151,029 | Henst | Mar. 21, 1939 |
| 2,241,254 | Garrison | May 6, 1941 |
| 2,246,725 | Garrison | June 24, 1941 |
| 2,354,570 | Benckenstein | July 25, 1944 |
| 2,379,516 | Garrison | July 3, 1945 |
| 2,599,752 | Fischer | June 10, 1952 |

FOREIGN PATENTS

| Number | Country | Date |
| --- | --- | --- |
| 195,995 | Great Britain | Apr. 11, 1923 |

OTHER REFERENCES

Clark, J. B.: "Hydrafrac Process for Increasing the Productivity of Wells," The Petroleum Engineer, Reference Annual, 1949, p. 530.